(12) United States Patent
Yamamoto et al.

(10) Patent No.: US 7,189,367 B2
(45) Date of Patent: Mar. 13, 2007

(54) REACTOR AND PROCESS FOR PRODUCTION THEREOF

(75) Inventors: Takatoki Yamamoto, Wako (JP); Teruo Fujii, Tokyo (JP); Jong Wook Hong, Tokyo (JP); Isao Endo, Kokubunnji (JP)

(73) Assignee: Riken, Wako (JP)

( * ) Notice: Subject to any disclaimer, the term of this patent is extended or adjusted under 35 U.S.C. 154(b) by 709 days.

(21) Appl. No.: 09/950,718

(22) Filed: Sep. 13, 2001

(65) Prior Publication Data
US 2002/0094303 A1 Jul. 18, 2002

(30) Foreign Application Priority Data
Sep. 13, 2000 (JP) ............... 2000-278502

(51) Int. Cl.
B01L 3/02 (2006.01)
B01J 19/00 (2006.01)

(52) U.S. Cl. ............ 422/100; 422/68.1; 422/99; 422/102; 422/130; 204/193; 204/400; 204/600

(58) Field of Classification Search .......... 422/99–104, 422/130
See application file for complete search history.

(56) References Cited

U.S. PATENT DOCUMENTS

| | | | | |
|---|---|---|---|---|
| 4,798,693 A | * | 1/1989 | Mase et al. ............ | 264/44 |
| 5,287,081 A | * | 2/1994 | Kinard et al. .......... | 338/24 |
| 5,345,213 A | * | 9/1994 | Semancik et al. ...... | 338/34 |
| 5,356,756 A | * | 10/1994 | Cavicchi et al. ....... | 430/315 |
| 5,824,204 A | * | 10/1998 | Jerman ................... | 204/601 |
| 6,079,873 A | * | 6/2000 | Cavicchi et al. ....... | 374/10 |
| 6,132,580 A | * | 10/2000 | Mathies et al. ........ | 204/453 |
| 6,136,212 A | * | 10/2000 | Mastrangelo et al. .. | 216/49 |
| 6,251,343 B1 | * | 6/2001 | Dubrow et al. ........ | 422/102 |
| 6,380,605 B1 | * | 4/2002 | Verhaegen ............. | 257/467 |
| 6,438,497 B1 | * | 8/2002 | Mansky et al. ........ | 702/22 |
| 6,485,625 B1 | * | 11/2002 | Simpson et al. ....... | 204/601 |
| 6,545,334 B2 | * | 4/2003 | Verhaegen ............. | 257/467 |
| 6,585,939 B1 | * | 7/2003 | Dapprich ............... | 422/99 |
| 6,602,714 B1 | * | 8/2003 | Tagge et al. ........... | 436/2 |
| 6,632,400 B1 | * | 10/2003 | Brennen et al. ........ | 422/82.01 |
| 6,632,652 B1 | * | 10/2003 | Austin et al. .......... | 435/287.2 |
| 6,692,700 B2 | * | 2/2004 | Handique ............... | 422/100 |
| 7,033,821 B2 | * | 4/2006 | Kim et al. ............. | 435/288.4 |

FOREIGN PATENT DOCUMENTS

| | | |
|---|---|---|
| JP | 61-187625 A | 8/1986 |
| JP | 5-507793 A | 11/1993 |
| JP | 9-197437 A | 7/1997 |
| JP | 10-340802 A | 12/1998 |
| JP | 2000-214476 A | 8/2000 |
| JP | 2001-527220 A | 12/2001 |
| WO | WO-91/16966 A1 | 11/1991 |
| WO | WO 9807069 A1 * | 2/1998 |
| WO | WO 9912016 A1 * | 3/1999 |
| WO | WO-99/33559 A1 | 7/1999 |

* cited by examiner

*Primary Examiner*—Jill Warden
*Assistant Examiner*—Dwayne K Handy
(74) *Attorney, Agent, or Firm*—Birch, Stewart, Kolasch, and Birch, LLP

(57) ABSTRACT

In order to be capable of a chemical reaction, analysis or the like wherein a small amount of samples is used, a reactor comprises a flat plate-like first substrate the inside of which is provided with a heating means; and a flat plate-like second substrate, which is placed on the top of the above-described first substrate, and on a surface thereof to be placed on the top of the above-described first substrate a flow channel having a predetermined contour has been defined.

12 Claims, 13 Drawing Sheets

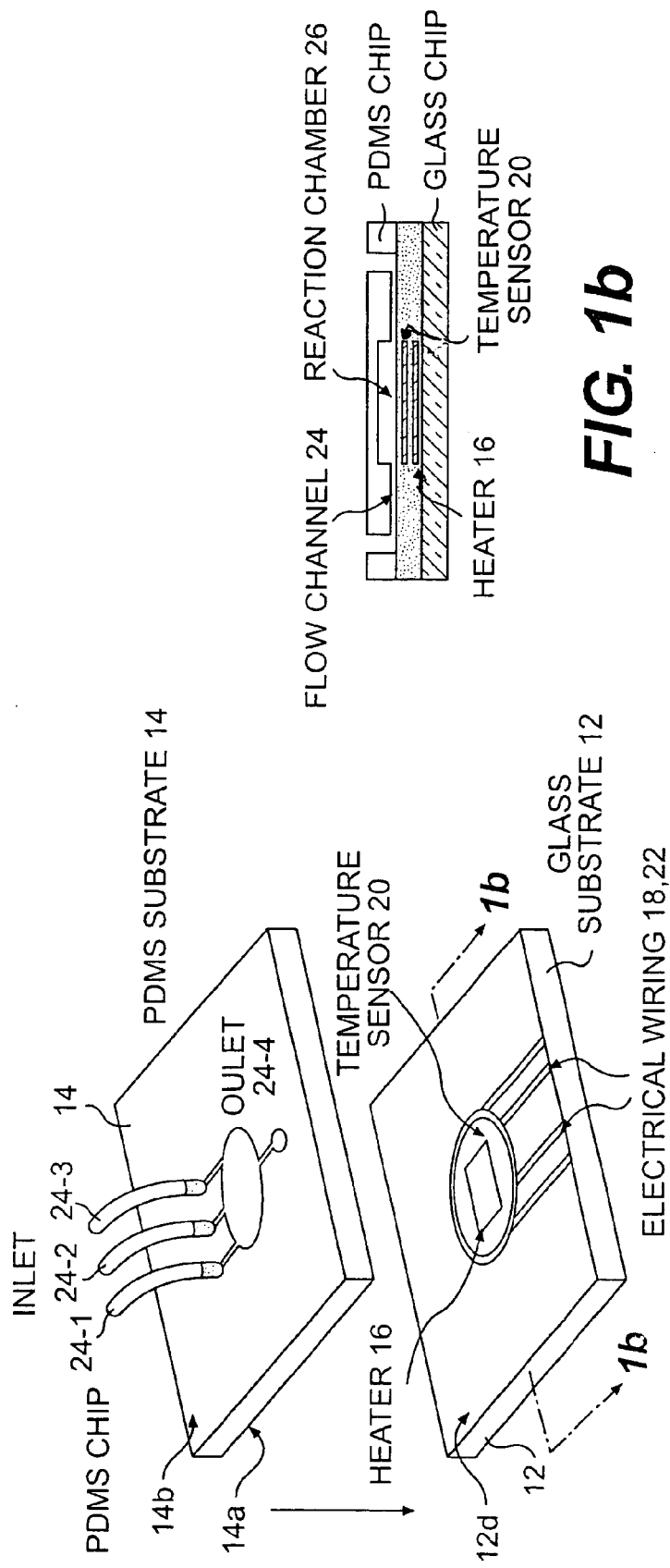

FLUORESCENT INTENSITY OF GFP

REACTOR AND PROCESS FOR PRODUCTION THEREOF

BACKGROUND OF THE INVENTION

1. Field of the Invention

The present invention relates to a reactor and the process for the production thereof, and more particularly to a reactor used suitably in case of implementing chemical reaction and analysis wherein a variety of samples are used.

2. Description of the Related Art

Heretofore, such a reactor with a reaction chamber having a predetermined size, the reaction chamber being charged with each predetermined amount of varieties of samples in response to the size of the reaction chamber to react these samples with each other, whereby a predetermined product is produced or a variety of analyses is made has been known.

Generally, in order to avoid contamination and the like in field of research, medical field and the like, a reactor, which is suitable for discarding it after using the same only one time, i.e., disposable reactor is desired.

However, a conventional reactor as described above must be upsized because of restriction in various structural problems. In such a large-sized reactor, since its reaction chamber itself is large, each large amount of samples are required in response to a size of the large-sized reactor. Accordingly, there has been such a problem that when each amount of the samples is small, such large-sized reactor cannot be used.

Moreover, a reaction chamber is large in a conventional reactor. Accordingly, there has been such a problem that a temperature in the reaction chamber becomes nonuniform, its reaction efficiency decreases, besides a number of by-products are produced.

Furthermore, a manufacturing cost of a conventional large-sized reactor having such an upsized reaction chamber increases, so that it must be expensive. There has been such a problem that it is not worth the cost to discard the reactor after using it only once.

OBJECT AND SUMMARY OF THE INVENTION

The present invention has been made in view of the above described various problems involved in the prior art.

Accordingly, an object of the invention is to provide a reactor wherein even if each small amount of samples is used, chemical reaction, analysis and the like can be implemented without accompanying any problem as well as a process for the production of such reactor.

Another object of the present invention to provide a reactor wherein a temperature in a reaction chamber is adapted to be uniform, whereby decrease in reaction efficiency and production of many by-products can be suppressed as well as a process for the production of such reactor.

A still another object of the present invention is to provide a reactor, which can be manufactured inexpensively, so that it is suitable for disposal after using the same only once, i.e., a disposable reactor as well as a process for the production thereof.

In order to achieve the above-described objects, a reactor according to the present invention comprises a flat plate-like first substrate the inside of which is provided with a heating means; and a flat plate-like second substrate that is placed on the top of the above-described first substrate and on a surface thereof to be placed on the top of the above-described first substrate a flow channel having a predetermined contour has been defined.

Therefore, according to the present invention, when the surface on which has been defined the flow channel having the predetermined shape in the second substrate is placed on a surface of the first substrate the inside of which is provided with the heating means, a channel structure of the reactor is sealed, whereby a chemical reaction or analysis can be conducted with the use of a small amount of samples poured into the flow channel.

Furthermore, a small amount of samples in the flow channel corresponding to the heating means comes to be uniformly heated, whereby a temperature in the flow channel corresponding to the heating means does not become nonuniform, so that reaction efficiency increases to be capable of reducing by-products.

Moreover, since a reactor of the present invention has a hybrid structure composed of a first substrate and a second substrate, a time for exchanging the first substrate and the second substrate may be different from each other. The second substrate is peeled off from the reactor to exchange it in each use thereof, while the first substrate, which is required for comparatively troublesome operations and an expensive cost in a fabrication thereof, may be washed and used repeatedly. Accordingly, such reactor is suitable for disposable use wherein it is discarded after the same was used only once.

In the present invention, the above-described flow channel in the above-described second substrate may be provided with a plurality of inlets.

In such arrangement as described above, plural samples can be poured into the flow channel at the same time, so that a variety of reactions can be conducted in a reactor.

In the present invention, a temperature sensor is disposed in between the above-described heating means provided on the inside of the above-described first substrate and the top of the above-described first substrate.

Therefore, according to the present invention, changes in electrical resistance from the temperature sensor are fed back to DC voltage to be applied to the heating means, whereby it is possible to implement temperature control and heating in the flow channel at the same time.

In the present invention, the above-described flow channel defined on the above-described second substrate forms a concaved depression with respect to the top of the above-described first substrate within a section opposed to the heating means provided on the inside of the above-described first substrate in the case when the above-described channel was defined on the top of the above-described first substrate, and the above-described concaved depression defines a chamber in the case when the above-described second substrate is placed on the top of the above-described first substrate.

Therefore, according to the present invention, the chamber is defined by the concave section in the flow channel of the reactor at a position opposed to the heating chamber, whereby samples poured in the flow channel are subjected to a predetermined reaction in the chamber under a predetermined temperature by means of the heating chamber.

Furthermore, in the present invention, the above-described heating means in the above-described first substrate has a rectangle-shaped region a long the top of the above-described first substrate, while the above-described concaved depression of the above-described flow channel in the above-described second substrate has a columnar shape, and a circle-shaped region of the bottom in the column-shaped concaved depression is narrower than the rectangle-shaped region of the above-described heating means in the above-described first substrate.

Therefore, according to the present invention, since the circle-shaped region of the bottom in the column-shaped concaved depression in the second substrate is narrower than the rectangle-shaped region of the heating means in the first substrate, the whole interior of the chamber comes to be uniformly heated by means of the heating means, whereby a temperature in the chamber does not become nonuniform, so that it is possible to increase reaction efficiency and to decrease by-products, besides high-speed and highly precise temperature control can be realized.

Moreover, in the present invention, all of the above-described first substrate, the above-described heating means provided on the inside of the above-described first substrate, the above-described temperature sensor, and the above-described second substrate may be transparent.

In such arrangement as described above, the whole reactor becomes transparent, whereby transmitted beam or fluorescence of a biological specimen poured in the reactor can be observed.

Still further, a reactor according to the present invention may comprise a transparent first substrate having a flat plate-like glass layer made from glass, a flat plate-like first $SiO_2$ layer made from $SiO_2$ and laminated on the glass layer, and a flat plate-like second $SiO_2$ layer made from $SiO_2$ and laminated on the first $SiO_2$ layer, first ITO (Indium Tin Oxide) having a rectangle-shaped region and Al extending to the first ITO being disposed in between the glass layer and the first $SiO_2$ layer, besides, a second ITO drawing a serpentine line in a region corresponding to the rectangle-shaped region of the first ITO disposed in between the glass layer and the first $SiO_2$ layer being disposed in between the first $SiO_2$ layer and the second $SiO_2$ layer; and a transparent second substrate made from PDMS (polydimethylsiloxane) in which when it is placed on the top of the second $SiO_2$ layer in the first substrate, a flow channel of a predetermined shape having a column-shaped concaved depression with respect to the top of the first substrate is formed on a surface faced in contact with the top of the second $SiO_2$ layer in the first substrate, the column-shaped concave depression having the bottom of a circle-shaped region narrower than the rectangle-shaped region of the first ITO in the first substrate within a section opposed to the first ITO in the first substrate; a column-shaped chamber being formed with the top of the second $SiO_2$ layer in the first substrate and the concaved depression in the second substrate in the case when the transparent second substrate is placed on the top of the second $SiO_2$ layer in the first substrate.

In the present invention, both of the above-described first substrate and the above-described second substrate may be microchips.

In such arrangement as described above, the reactor can constitute a very small system itself as a micro system, so that it is required for a sufficiently small space in placing the reactor.

Yet further, a process for the production of a reactor according to the present invention comprises a first process step for providing a heating means on a surface of a layer, which has been already formed in case of laminating a plurality of layers, and further laminating a new layer on the layer on which has been provided the heating means to form a first substrate the inside of which has been provided with a heating means; a second process step for fabricating a master having a convex structure being a template of a flow channel having a predetermined shape and templating a material to form a second substrate by the use of the master; and a third process step for bonding the first substrate prepared in accordance with the first process step to the second substrate prepared in accordance with the second process step in such that the surface on which has been defined the flow channel having the predetermined shape in the second substrate is placed on the top of the first substrate.

Therefore, according to the present invention, the master having a convex structure that is used for a template of the flow channel in the second substrate can be utilized repeatedly, so that a number of second substrates can easily be fabricated through patterning operation of only a small number of times with reuse of the master, besides it is advantageous for producing a micro structure at a low cost.

In addition, a process for the production of a reactor according to the present invention may comprise a first process step for forming an ITO film on a surface of a glass substrate with a predetermined film thickness; a second process step for patterning the ITO film formed on the surface of the glass substrate in accordance with the first process step into a rectangular shape to provide a heating means; a third process step for patterning so as to extend to the heating means provided in accordance with the second process step to provide an electrical wiring; a fourth process step for forming a $SiO_2$ layer on the surface of the glass substrate to which has been applied the third process step with a predetermined film thickness; a fifth process step for forming an ITO film on the surface of the $SiO_2$ layer formed in accordance with the fourth process step with a predetermined film thickness; a sixth process step for patterning the ITO film formed on the surface of the $SiO_2$ layer in accordance with the fifth process step so as to draw a serpentine line to provide a temperature sensor; a seventh process step for patterning Al so as to extend to the temperature sensor provided in accordance with the sixth process step to provide an electrical wiring; an eighth process step for forming a $SiO_2$ layer on the surface of the $SiO_2$ film, to which has been applied the seventh process step, with a predetermined film thickness to complete a fabrication of the glass substrate; a ninth process step for spin-coating a photoresist SU-8 on a surface of a silicon wafer under a predetermined condition; a tenth process step for transferring a pattern of a flow channel having a predetermined shape to the silicon wafer on which has been applied the SU-8 by the ninth process step in accordance with a manner of photolithography; an eleventh process step for spin-coating the SU-8 on the surface of the silicon wafer to which has been applied the tenth process step and etching the same to form a master; a twelfth process step for allowing the master formed in accordance with the eleventh process step to stand in a $CHF_3$ plasma atmosphere and treating the same with fluorocarbon to form a fluorocarbon layer on the surface of the master; a thirteenth process step for pouring an unpolymerized PDMS (Dow Corning, Sylgard184) prepared by admixing the same with a curing agent in a ratio of 10:1 into the master to which had been applied the twelfth process step and curing the same due to polymerization by heat treatment to fabricate a PDMS substrate replica; a fourteenth process step for peeling off the PDMS substrate replica fabricated in accordance with the thirteenth process step from the master and defining an inlet and an outlet on the PDMS substrate replica to complete a fabrication of the PDMS substrate; and a fifteenth process step for bonding the glass substrate fabricated in accordance with the eighth process step to the PDMS substrate fabricated in accordance with the fourteenth process step in such that the surface, on which has been defined the flow channel having the predetermined shape in the PDMS substrate, is placed on the top of the glass substrate.

BRIEF DESCRIPTION OF THE DRAWING

The present invention will become more fully understood from the detailed description given hereinafter and the accompanying drawings which are given by way of illustration only, and thus are not limitative of the present invention, and wherein:

FIGS. 1(a), (b), and (c) show an example of an embodiment of a reactor according to the present invention wherein FIG. 1(a) is an exploded perspective view showing the reactor according to the present invention, and FIGS. (b) and (c) are schematic constitutional views each, in section, showing the reactor according to the present invention;

FIGS. 8(a) and 8(b) are views each illustrating processes for an experimental system in which a reactor according to the present invention is used wherein FIG. 8(a) is an explanatory view showing principally a flow channel into which two types of samples are poured, respectively, and FIG. 8(b) is an explanatory view showing principally the flow channel into which a buffer is poured following to the process of FIG. 8(a);

FIGS. 11(a) and 11(b) are schematic constitutional explanatory views each showing an embodiment in which plural reactors according to the present invention are applied wherein FIG. 11(a) illustrates a case where the plural reactors are applied separately, while FIG. 11 (b) illustrates a case where the plural reactors are applied integrally.

DETAILED DESCRIPTION OF THE PREFERRED EMBODIMENTS

In the following, one example of a preferred embodiment of a reactor and a process for the production thereof according to the present invention will be described in detail by referring to the accompanying drawings.

Figure 1C:
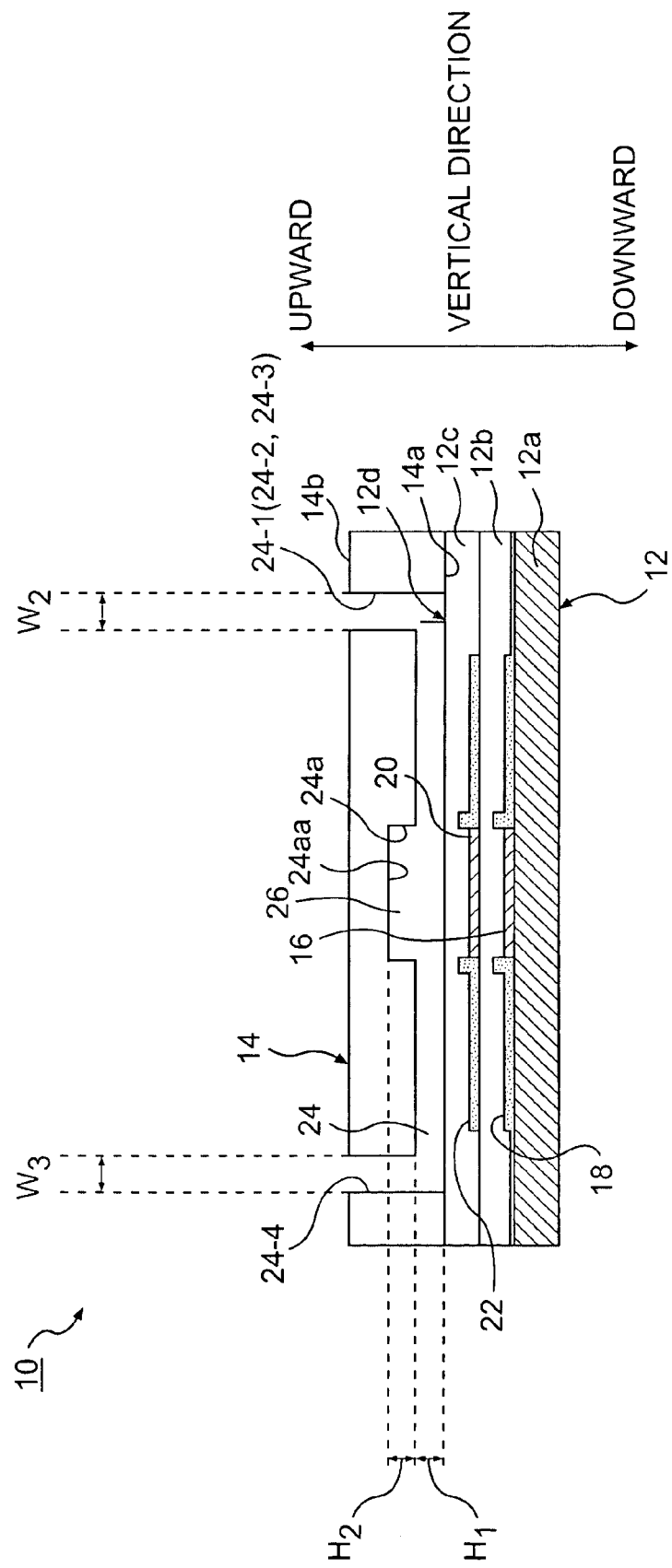

FIGS. 1(a), 1(b), and 1(c) are views each showing an example of an embodiment of a reactor according to the present invention wherein FIG. 1(a) is an exploded perspective view showing a reactor according to the present invention, and FIGS. 1(b) and 1(c) are schematic constitutional views each, in section, showing a reactor according to the present invention.

A reactor 10 is composed of a flat plate-like glass substrate 12 inside which a heater 16 and a temperature sensor 20 are disposed and a flat plate-like PDMS substrate 14, wherein a flow channel 24 has been defined that is placed on the top surface 12d of the glass substrate 12.

All the dimensions of the reactor 10 are, for example, 20 mm length, 20 mm width, and 1 mm height, respectively, as well as both of the glass substrate 12 and the PDMS substrate 14 are microchips, respectively.

Furthermore, since both the glass substrate 12 and the PDMS substrate 14 are transparent in accordance with the procedure, which will be mentioned hereinafter, the whole reactor 10 is also transparent.

First, the glass substrate 12 is specifically composed of a flat plate-like glass layer 12a made of glass, a flat plate-like $SiO_2$ layer 12b made of $SiO_2$ and laminated on the glass layer 12a, and a flat plate-like $SiO_2$ layer 12c made of $SiO_2$ and laminated on the $SiO_2$ layer 12b.

Accordingly, the top surface 12d of the glass substrate 12 corresponds to the top surface 12c of the $SiO_2$ layer 12c laminated as the uppermost layer.

Figure 2A:
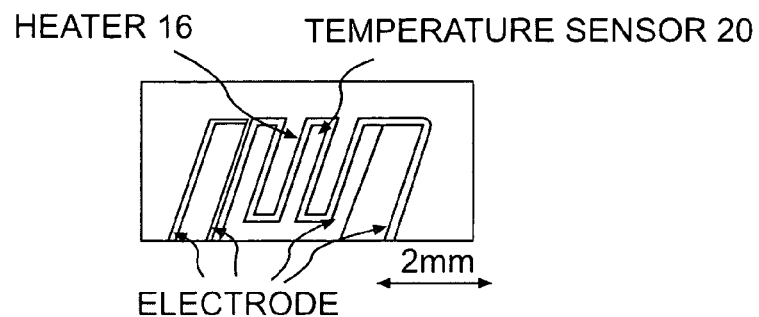
FIG. 2(a) is an enlarged perspective view showing principally a heater and a temperature sensor in a reactor according to the present invention.
Figure 2B:
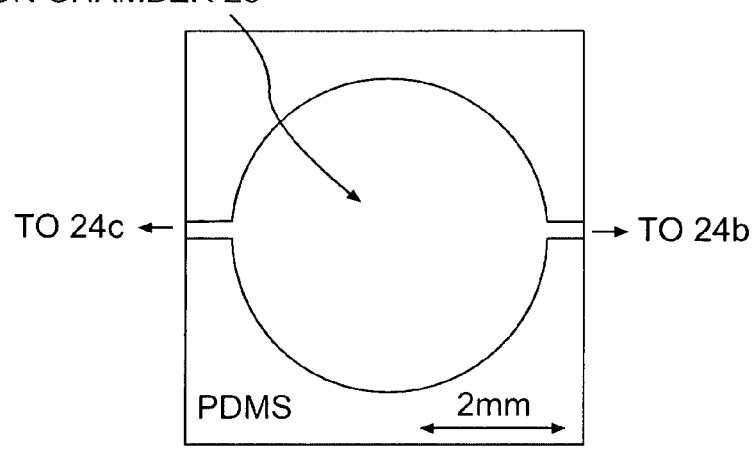
FIG. 2(b) is an enlarged explanatory view showing principally a reaction chamber of a reactor according to the present invention.
Figure 2C:
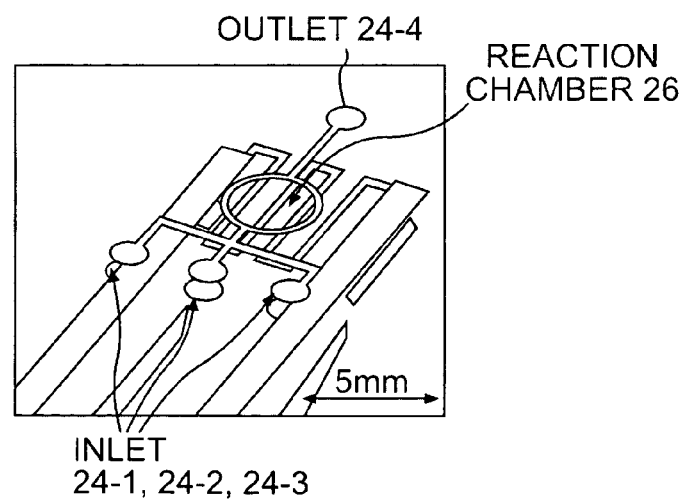
FIG. 2(c) is an enlarged perspective view showing a reactor, in essential part thereof, according to the present invention.

Moreover, a flat plate-like heater 16 occupying a rectangle-shaped region and an electric wiring 18 for supplying electric power, which extends to the heater 16, are disposed in between the glass layer 12a and the $SiO_2$ layer 12b (see FIG. 2(a)).

Furthermore, a temperature sensor 20, which draws a serpentine line in a region corresponding to the rectangle-shaped region of the heater 16 and an electric wiring 22 for supplying electric power, which extends to the temperature sensor 20, are disposed in between the $SiO_2$ layer 12b and the $SiO_2$ layer 12c (see FIG. 2(a)).

Accordingly, the temperature sensor 20 is positioned in between the heater 16 and the top surface 12d of the glass substrate 12, the heater 16 being disposed between the glass layer 12a and the $SiO_2$ layer 12b. Further, the $SiO_2$ layer 12b and the $SiO_2$ layer 12C function as insulating layers, besides the $SiO_2$ layer 12c functions as a protective layer for a surface of the glass substrate 12.

Besides, both of the heater 16 and the temperature sensor 20 are prepared from a transparent conductor of ITO (Indium Tin Oxide), and the electric wirings 18 and 22 are prepared from Al, so that all of the heater 16, the temperature sensor 20, and the electric wirings 18 and 22 are transparent.

In this connection, since all of the glass layer 12a, the $SiO_2$ layer 12b, and the $SiO_2$ layer 12c are transparent, the glass substrate 12 comes to be also transparent.

On one hand, the PDMS substrate 14 is a transparent microchip prepared from PDMS (polydimetylsiloxane).

The flow channel 24 having a predetermined configuration are defined on the bottom surface 14a of the PDMS substrate 14 that is to be disposed on the top surface 12d of the glass substrate 12.

More specifically, the flow channel 24 is provided with three inlets 24-1, 24-2, and 24-3 opened on the top surface 14b of the PDMS substrate 14 as well as with one outlet 24-4 opened on the top surface 14b of the PDMS substrate 14, a column-shaped concave section 24a, a mixing section 24b extending from three inlets 24-1, 24-2, and 24-3 to the concave section 24*a*, and a discharging section 24*c* extending from the concave section 24*a* to the outlet 24-4.

In this case, a flow channel portion 24*d* extending from the inlet 24-1 to the mixing section 24*b*, and a flow channel portion 24*f* extending from the inlet 24-3 to the mixing section 24*b* are bent at a certain position, respectively, while a flow channel portion 24*e* extending from the inlet 24-2 to the mixing section 24*b* is in the form of a straight line.

Furthermore, the concave section 24*a* is a columnar shape a bottom 24*aa* of which is in a circular shape that is depressed in a concave shape with respect to the top surface 12*d* of the glass substrate 12, and as a result, a column-shaped reaction chamber 26 is defined by the top surface 12*d* of the glass substrate 12, i.e., the top surface of the $SiO_2$ layer 12*c* and the concave section 24*a*.

A region of the bottom 24*aa* of the concave section 24*a* is dimensioned so as to be narrower than the rectangular shape of the heater 16 disposed inside the glass substrate 12. Furthermore, the concave section 24*a* is arranged to be dimensioned in such that it is opposed to the heater 16 disposed inside the glass substrate 12 in the case when the PDMS substrate 14 is placed on the top 12*d* of the glass substrate 12.

Thus, components are positioned successively along a vertical direction of the reactor 10 in such that the heater 16 having a rectangle-shaped region is positioned on the lower side of the reactor 10, the temperature sensor 20 drawing a serpentine line in a region corresponding to the rectangle-shaped region is positioned over the upper side of the heater 16, and further the reaction chamber 26 defined by the concave section 24*a* having the narrower bottom 24*aa* than the rectangle-shaped region of the heater 16 is positioned over the upper side of the temperature sensor 20.

A width $W_1$ of the flow channels 24*d*, 24*e*, 24*f*, the mixing section 24*b*, and the discharging section 24*c* is set to, for example, 100 µm, a height $H_1$ of the flow channels 24*d*, 24*e*, 24*f*, the mixing section 24*b*, and the discharging section 24*c* is, for example, 40 µm, a diameter $W_2$ of the inlets 24-1, 24-2, and 24-3 is, for example, 1 mm, and a diameter $W_3$ of the outlet 24-4 is, for example, 1 mm.

Moreover, a diameter $W_4$ of the reaction chamber 26 (i.e., the bottom 24*aa*) is, for example, 4 mm, and a height $H_2$ of the reaction chamber 26 is, for example, 40 µm, so that a volume of the reaction chamber 26 is about 1 µl in case of a condition of the dimensions enumerated as above.

In the following, a process for producing the reactor 10 having a hybrid structure composed of the above-described glass substrate 12 and the PDMS substrate 14 will be described in detail.

FIGS. 4(*a*), 4(*b*), 4(*c*), 4(*d*), 4(*e*), 4(*f*), 4(*g*), 4(*h*), 4(*i*), and 4(*j*) are explanatory views each illustrating schematically a producing process for the reactor 10, FIGS. 5(*a*), 5(*b*), 5(*c*), and 5(*d*) are explanatory views each illustrating in detail a producing process for a glass substrate 12 in the reactor 10, and FIGS. 6(*a*), 6(*b*), 6(*c*), 6(*d*), and 6(*e*) are explanatory views each illustrating in detail a producing process for a PDMS substrate 14 in the reactor 10.

First, a process for producing the glass substrate 12 in the reactor 10 will be described (see FIGS. 4(*a*), 4(*b*), 4(*c*), 4(*d*) as well as FIGS. 5(*a*), 5(*b*), 5(*c*), and 5(*d*)). An ITO film having 500 nm thickness is sputtered on a surface of a glass substrate (for forming a glass layer 12*a*) that has been washed in accordance with a predetermined method and has a size of 20 mm×20 mm (see FIG. 4(*a*) and FIG. 5(*a*).

The ITO film formed on the surface of the glass substrate is patterned into a rectangular shape by means of photolithography and wet etching to form a heater 16 (see FIG. 4(*b*) and FIG. 5(*a*)).

Then, Al is formed into a film having a predetermined thickness by vacuum evaporation, and the resulting Al film is patterned by means of photolithography and wet etching to form an electrical wiring 18 so as to extend to the heater 16 (see FIG. 4(*c*) and FIG. 5(*b*)).

Thereafter, an $SiO_2$ film having a thickness of about 300 nm is sputtered thereon to form an $SiO_2$ layer 12*b* (see FIG. 4(*c*) and FIG. 5(*c*)).

After formation of the glass layer 12*a* and the $SiO_2$ layer 12*b*, an ITO film having 500 nm thickness is sputtered on a surface of the $SiO_2$ layer 12*b* (see FIG. 4(*c*) and FIG. 5(*d*)).

Next, the ITO film formed on the surface of the $SiO_2$ layer 12*b* is patterned so as to draw a serpentine line by means of photolithography and wet etching to form a temperature sensor 20 (see FIG. 4(*c*) and FIG. 5(*d*)).

Thereafter, Al is vacuum evaporated thereon to form a film of a predetermined thickness, and the resulting Al film is patterned so as to extend to the temperature sensor 20 by means of photolithography and wet etching thereby to form an electric wiring 22 (FIG. 4(*c*) and FIG. 5(*d*)).

Then, an $SiO_2$ film having a thickness of about 500 nm is sputtered thereon to form an $SiO_2$ layer 12*c* thereby completing to fabricate the glass substrate 12 (see FIG. 4(*d*) and FIG. 5(*d*)).

In the following, a process for producing the PDMS substrate 14 in the reactor 10 will be described (see FIGS. 4(*e*), 4(*f*), 4(*g*), 4(*h*), 4(*i*) as well as FIGS. 6(*a*), 6(*b*), 6(*c*), 6(*d*), and 6(*e*)).

First, a photoresist SU-8 is spin-coated on a surface of a silicon wafer (Si) of 20 mm×20 mm (FIG. 4(*e*)) under a predetermined condition (see FIG. 4(*a*) and FIG. 6(*a*)).

Then, a pattern of a flow channel 24 having a predetermined configuration defined on the bottom 14*a* of the above-described PDMS substrate 14 is transferred to the silicon wafer on which has been coated SU-8 in accordance with a lithographic manner (see FIG. 6(*b*)). Further, a master 200 is fabricated by means of spin-coating of the photoresist SU-8 and etching (see FIG. 4(*f*) and FIG. 6(*c*)).

Hence, the master 200 thus fabricated is to be used as a matrix for the flow channel 24 of the PDMS substrate 14 having a convex contour.

Before pouring a PDMS prepolymer, the master 200 fabricated is allowed to stand in a $CHF_3$ plasma atmosphere and treated with fluorocarbon to form a fluorocarbon layer on the surface of the master 200 (see FIG. 4(*g*) and FIG. 6(*c*)).

Such fluorocarbon treatment as described above is useful for releasing a PDMS substrate replica after templating.

Thereafter, an unpolymerized PDMS (Dow Corning, Sylgard 184), which has been prepared by admixing a major component with a curing agent in such that the former: the latter=10:1, is poured over the master 200, and cured by polymerization in accordance with a heat treatment thereby to fabricate the PDMS substrate replica 14' (see FIG. 4(*h*) and FIG. 6(*d*)).

Then, the PDMS substrate replica 14' thus fabricated is peeled off from the master 200. Inlets 24-1, 24-2, and 24-3 as well as an outlet 24-4 are bored on the PDMS substrate replica 14', whereby a fabrication of the PDMS substrate 14 is completed (see FIG. 4(*i*) and FIG. 6(*e*)).

Figure 4A:
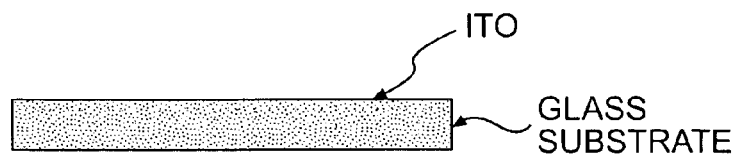
FIGS. 4(a), 4(b), 4(c), 4(d), 4(e), 4(f), 4(g), 4(h), 4(i), and 4(j) are schematic explanatory views each illustrating a producing process for a reactor according to the present invention.
Figure 4B:
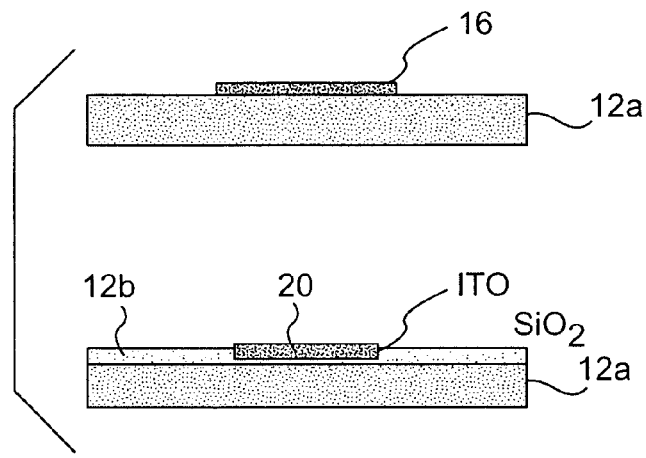
Figure 4C:
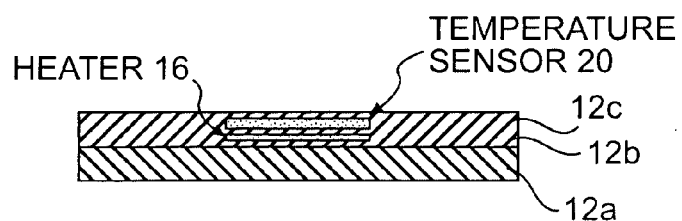
Figure 4D:
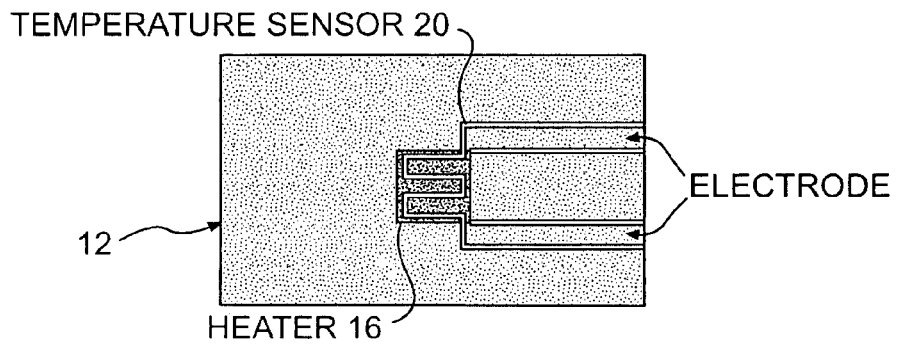
Figure 4E:
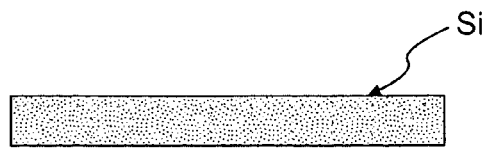
Figure 4F:
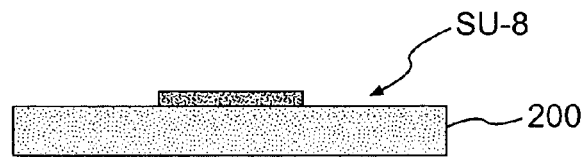
Figure 4G:
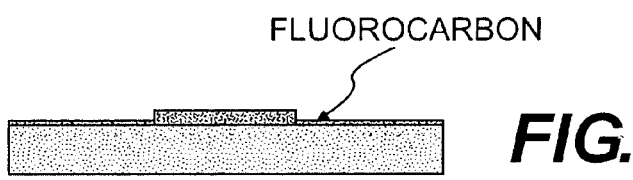
Figure 4H:
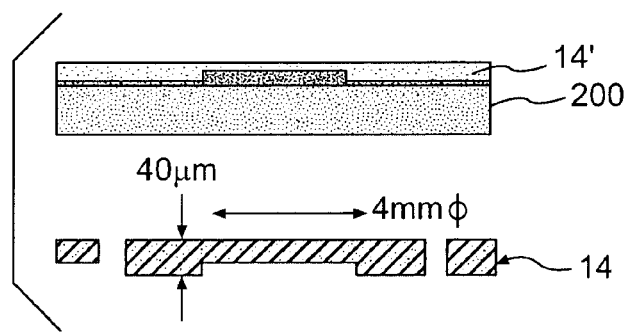
Figure 4I:
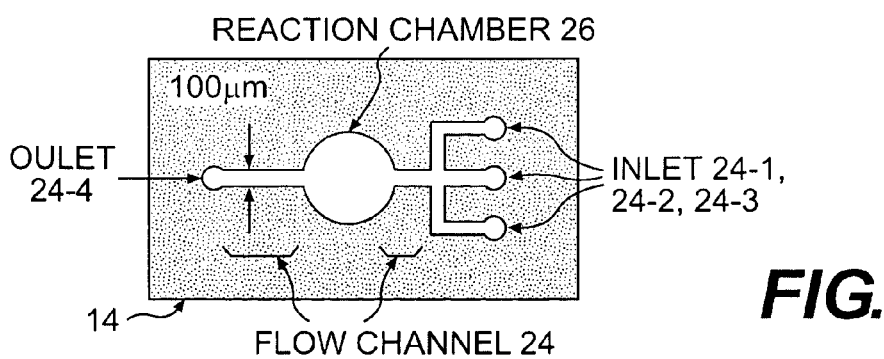
Figure 4J:
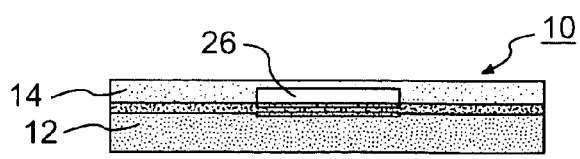
Figure 5A:
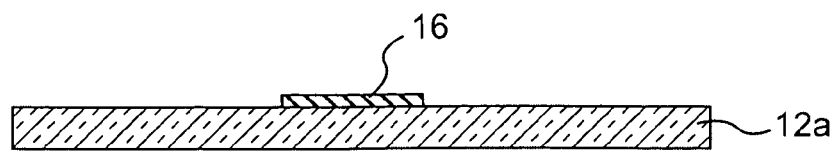
FIGS. 5(a), 5(b), 5(c), and 5(d) are schematic explanatory views each illustrating a producing process for a glass substrate in a reactor according to the present invention.
Figure 5B:
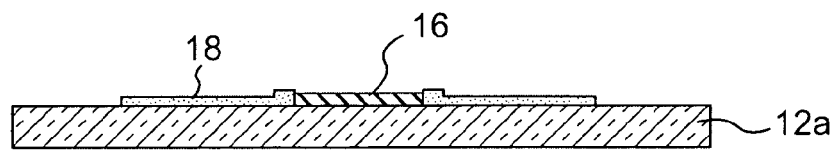
Figure 5C:
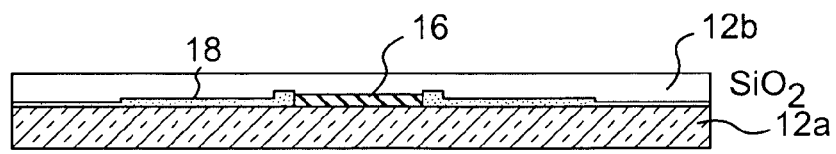
Figure 5D:
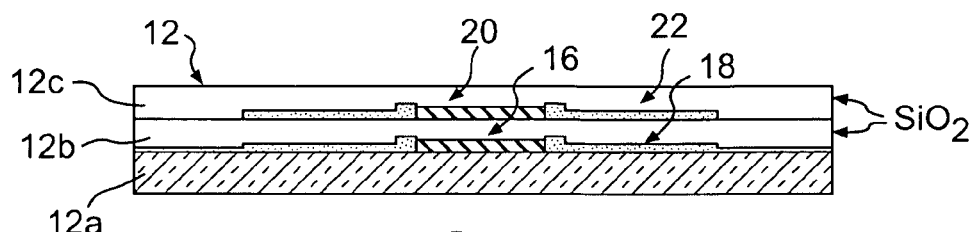
Figure 6A:
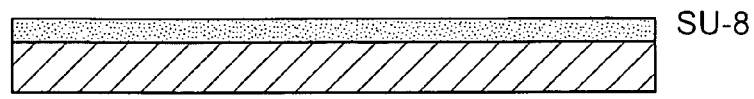
FIGS. 6(a), 6(b), 6(c), 6(d), and 6(e) are schematic explanatory views each illustrating a producing process for a PDMS substrate in a reactor according to the present invention.
Figure 6B:
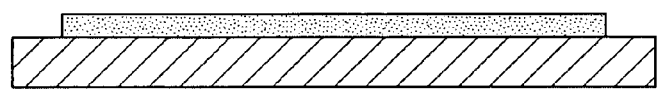
Figure 6C:
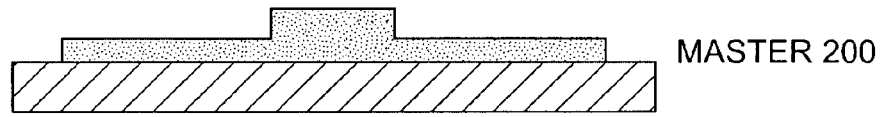
Figure 6D:
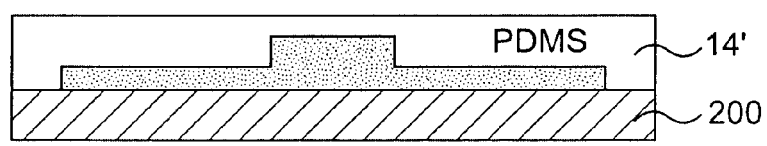
Figure 6E:
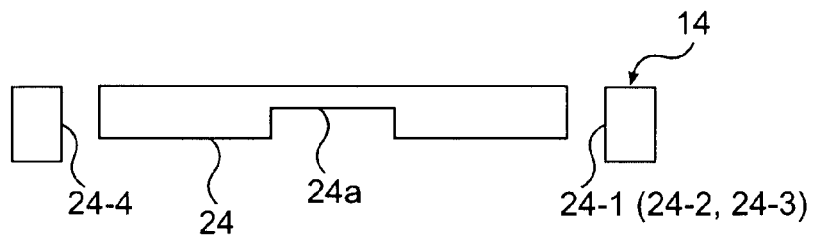

After completing a fabrication of the glass substrate 12 (see FIG. 4(*d*) and FIG. 5(*d*)) and that of the PDMS substrate 14 (FIG. 4(*i*) and FIG. 6(*e*)) as described above, the PDMS substrate 14 is bonded to the top 12d of the glass substrate 12 while positioning in such that a concave section 24a of the PDMS substrate 14 is opposed to the heater 16 and the temperature sensor 20 in the glass substrate 12 at a predetermined position, so that a channel contour in the reactor 10 is hermetically sealed to complete a fabrication of the reactor 10 (see FIG. 1(c) and FIG. 4(j)).

Since PDMS forming the PDMS substrate 14 has spontaneous adhesivity with respect to a flat surface, the PDMS substrate 14 adheres to the top 12d of the glass substrate 12 in this case due to such spontaneous adhesivity of the PDMS without requiring any special bonding process.

On the other hand, the PDMS substrate 14 disposed on the top 12d of the glass substrate 12 based on such spontaneous adhesivity of PDMS as described above can be easily peeled off from the top 12d of the glass substrate 12. As a result, there is no case where a part of the PDMS substrate 14 remains on the top 12d of the glass substrate 12 in an adsorbed state after peeling the PDMS substrate 14 off from the top 12d of the glass substrate 12.

In the following, experimental results of chemical reactions wherein a reactor 10 produced as described above is employed will be described.

In an embodiment, which will be described hereinafter, a transcription-translation reaction by which a fluorescent protein is obtained as a synthetic product is carried out by the use of the reactor 10, and an amount of fluorescence in the fluorescent protein synthesized in the reaction is monitored, whereby quantitative determination of a reaction product is attained.

The fluorescent protein, which is a reaction product, is a variant GFPuv (6089-1, Clonetech) of GFP (Green Fluorescent Protein) that is most popularly used in biochemical field.

As a GFP expression vector, the one in which its genes have been previously introduced into multiple cloning sites of pUC19 together with binding sites of T7 promoter was used.

Figure 7:
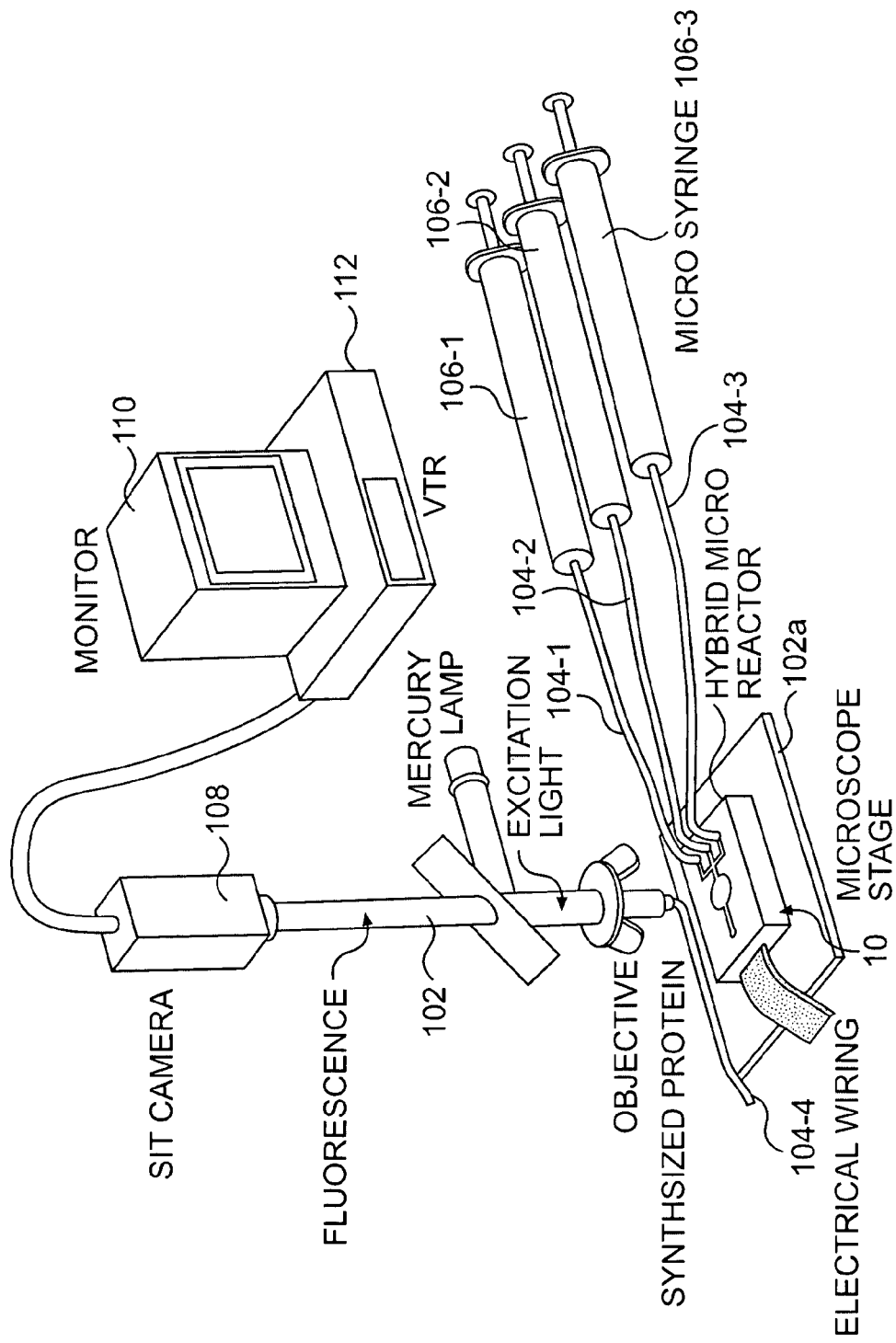
FIG. 7 is an explanatory view showing an experimental system using a reactor according to the present invention.

FIG. 7 is an explanatory view showing a constitution of an experimental system wherein all of experiments are implemented under a fluorescent microscope 102, and a reactor 10 is set on a stage 102a of the microscope. Various samples such as reagents are supplied from micro syringes 106-1, 106-2, and 106-3 connected to inlets 24-1, 24-2, and 24-3 in the reactor 10 through silicone tubes 104-1, 104-2, and 104-3, respectively.

Moreover, a silicone tube 104-4 is connected to an outlet 24-4 in the reactor 10, so that it is arranged in such that a reaction product and the like are discharged outside the reactor 10 from the outlet 24-4 through the silicone tube 104-4.

Furthermore, fluorescent intensity in the reactor 10 is measured by an SIT camera (Hamamatsu Photonics K.K.) mounted on the upper port of the microscope 102, and measured results of the SIT camera 108 are displayed on a monitor 110 in real time, and at the same time, they may be recorded by means of a video tape recorder 112.

Temperatures in the reaction chamber 26 of the reactor 10 are controlled by feeding back changes in electrical resistance from the temperature sensor 20 to a DC voltage to be applied to the heater 16.

In this case, a feedback cycle is 1 ms, and a temperature in the reaction chamber 26 of the reactor 10 is kept during reaction at 37° C., which is the most suitable temperature for the reaction, in accordance with PID control wherein "Lab View" (National Instruments Co.) being a software for controlling measurement is used.

A heating rate in the case where a temperature of the reaction chamber 26 in the reactor 10 is heated from room temperature to 37° C. is about 20° C./sec., and a temperature error in a constant condition is ±0.1° C., so that high-speed and highly precise temperature control is realized in the reactor 10.

Such high-speed and highly precise temperature control as described above can be realized based on such fact that a volume of the reaction chamber 26 in the reactor 10 is very small, i.e., about 1 μl, and that the bottom 24aa of the reaction chamber 26 is dimensioned to be narrower than a rectangle-shaped region of the heater 16, whereby the whole reaction chamber 26 is uniformly heated by the heater 16.

Figure 8A:
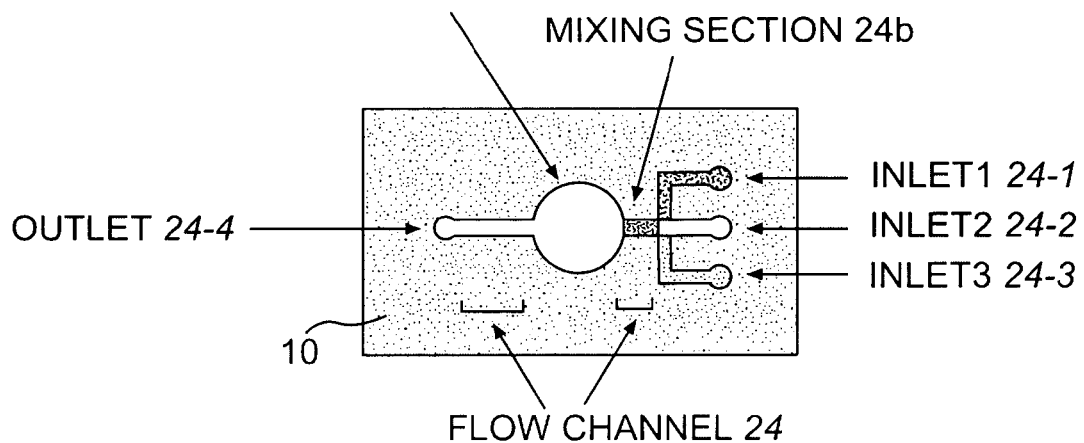

In these circumstances, first, a solution containing GFPuv vector is poured from the micro syringe 106-1 through the inlet 24-1, and at the same time, a solution containing RNA polymerase, ribosome, amino acids and the like for synthesizing GFPuv is poured from the micro syringe 106-3 through the inlet 24-3 (see FIG. 8(a)).

Figure 8B:
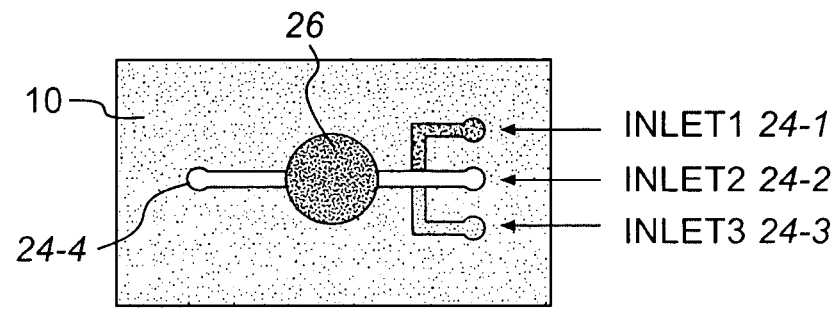

Thereafter, a buffer is poured from the micro syringe 106-2 through the inlet 24-2, the solutions poured from the inlets 24-1, 24-2, and 24-3 into the reactor 10, respectively are admixed with each other in the mixing section 24b of the flow channel 24, and transferred into the reaction chamber 26 (see FIG. 8(b)).

Then, transcription-translation reaction is effected by the DNA, various enzymes and the like, which have been supplied in the reaction chamber 26 that is in a state lagged at 37° C. for a certain period of time, where by GFPuv being a fluorescent protein is synthesized.

As a result of observation upon irradiation of excitation light with respect to the reactor 10 in every predetermined periods of time, a difference in fluorescent intensity between the inside and the outside of the reaction chamber 26 is not observed in the reactor 10 before pouring the various solutions, in other words, before starting synthesis of GFPuv.

However, fluorescent intensity inside the reaction chamber 26 is stronger than that outside the reaction chamber 26 in the reactor 10 at the time that is two hours after starting to synthesize the GFPuv as a result of pouring the various solutions, and green light emission peculiar to GFP could be observed. Thus, it could be confirmed that GFPuv was synthesized in the reaction chamber 26.

Figure 9:
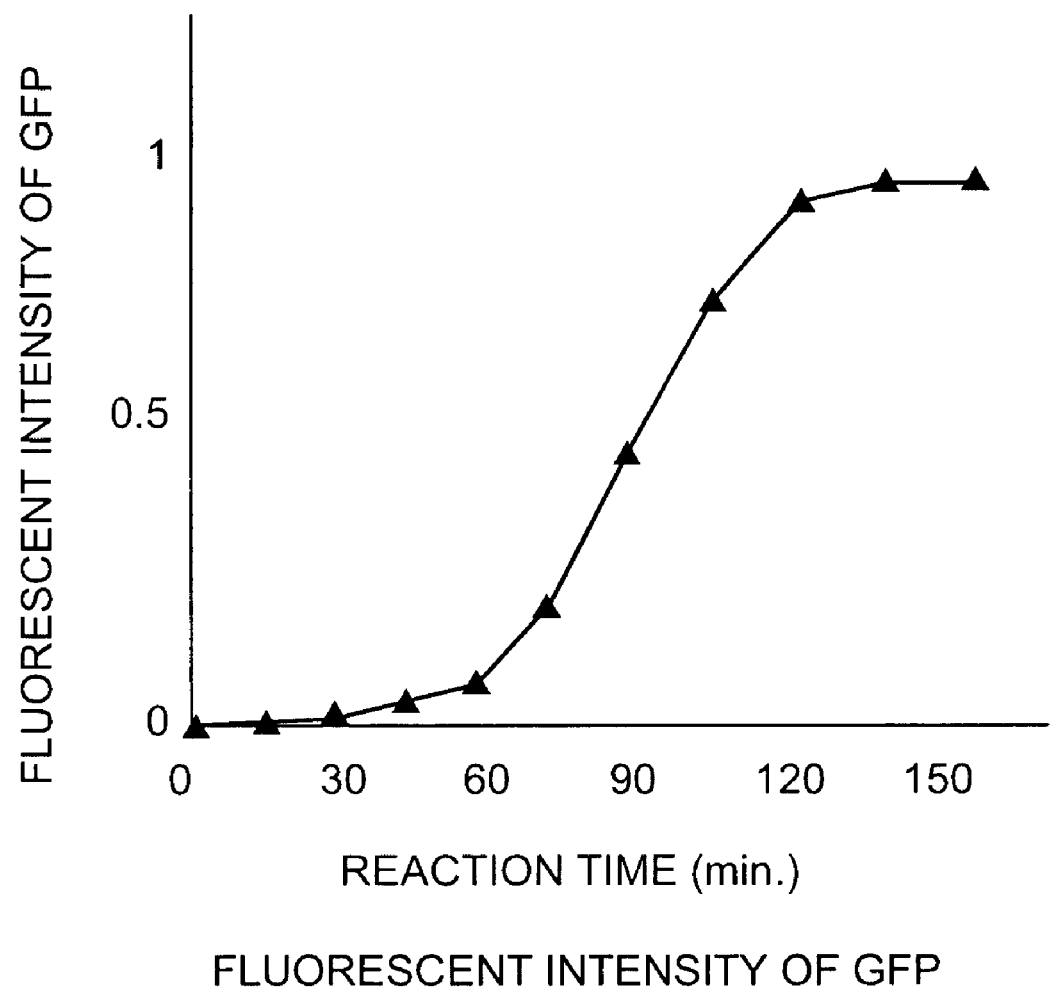
FIG. 9 is a graphical representation indicating time variation of fluorescent intensity in a reaction chamber during synthesis of GFPuv wherein a reactor according to the present invention is used.
Figure 10A:
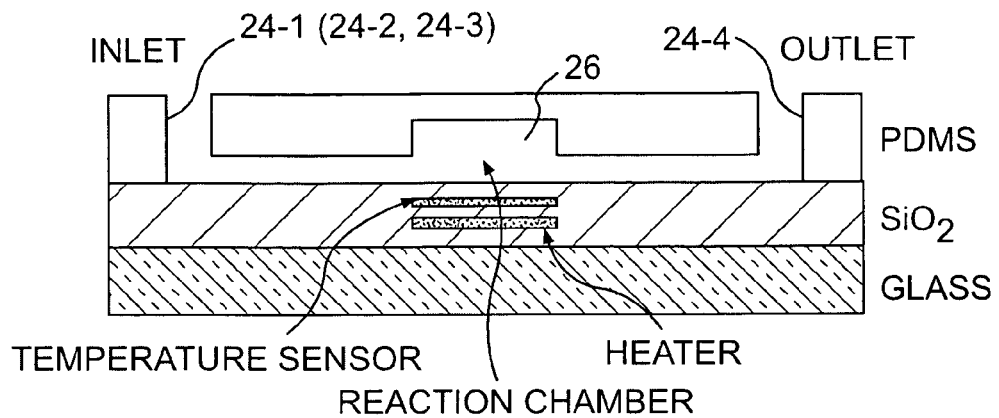
FIG. 10 is a schematic constitutional view, in section, showing another example of an embodiment of a reactor according to the present invention.
Figure 10B:
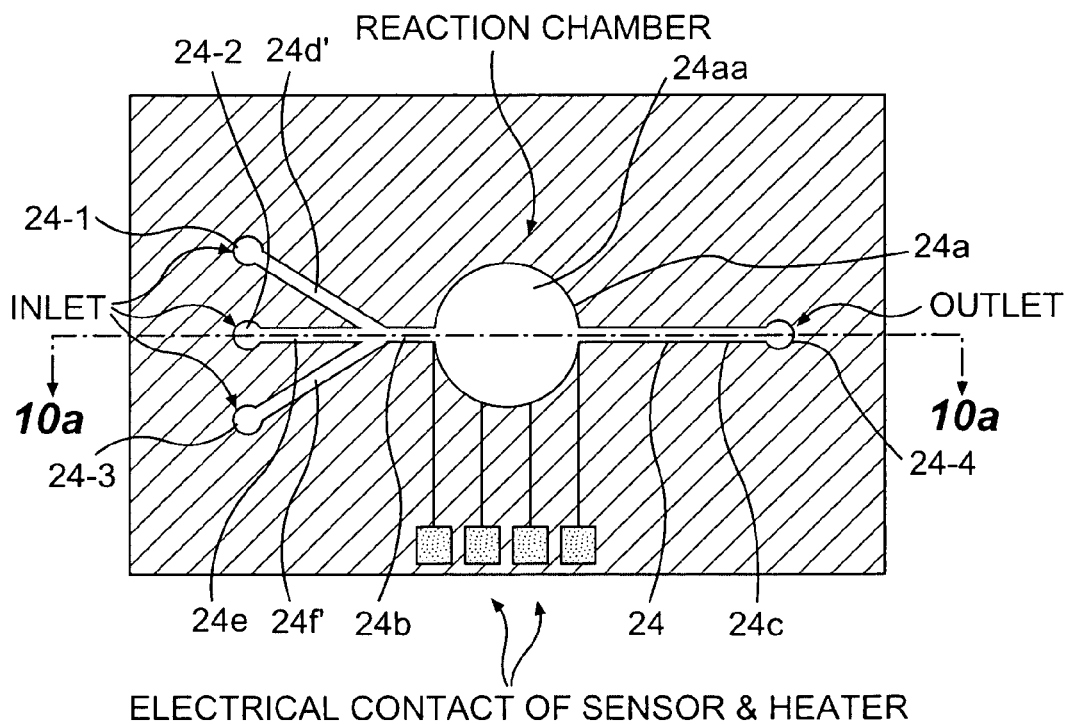

FIG. 9 is a graph indicating results obtained by measuring changes in fluorescent intensity in the reaction chamber 26 with time during synthesis of GFPuv. As a result, when various solutions are poured (reaction time is zero minute in FIG. 9) to start synthesis of GFPuv, a raise in fluorescent intensity in the reaction chamber 26 can be observed, so that synthesis of GFPuv can be confirmed with time.

It is to be noted that no change in fluorescent intensity is observed during about thirty minutes from starting synthesis (the reaction time, zero minute in FIG. 9). In this respect, it may be considered to mean a time required for folding to form a chromophore after synthesizing GFPuv.

Furthermore, fluorescent intensity has been saturated after about two hours from starting synthesis. It is considered that material elements required for synthesizing protein such as amino acids existing in the reaction chamber 26 are exhausted, whereby synthesis is stopped.

Accordingly, fluorescent intensity increases at a certain ratio with respect to time before completing transcription-translation reaction based on DNA as well as various enzymes and the like supplied. From the result obtained, it is considered that GFPuv has been synthesized at a certain ratio.

In accordance with the manner as described above, a reactor 10 of the present invention has a hybrid structure composed of a glass substrate 12 and a PDMS substrate 14 both of which are microchips, whereby the whole reactor 10 can be realized as a micro system. Hence, it is possible that a whole size of the reactor 10 is made to be 20 mm length, 20 mm width, and 1 mm height, so that a volume of a reaction chamber 26 being a reaction space comes to be about one 1 µl. As a result, chemical reaction, analysis or the like wherein a small amount of samples is used can be conducted.

Furthermore, according to a reactor 10 of the present invention, a heater 16 and a temperature sensor 20 made from ITO of a transparent conductor are disposed inside a glass substrate 12, whereby demagnification and integration of heater and sensor, which are used for temperature control, can be realized. Besides, temperature control and heating of the inside of a reaction chamber 26 can be made at the same time by feeding back changes in electrical resistance from the temperature sensor 20 to DC voltage to be applied to the heater 16.

Moreover, according to a reactor 10 of the present invention, a volume of a reaction chamber 26 is made to be very small, i.e., about 1 µl, and the bottom 24aa of the reaction chamber is made to dimension narrower than a rectangle-shaped region of a heater 16. Hence, the whole interior of the reaction chamber 26 comes to be uniformly heated by the heater 16, so that a temperature in the reaction chamber 26 becomes homogeneous, resulting in good reaction efficiency and less production of by-products.

Still further, a reactor 10 according to the present invention realizes high-speed and highly precise temperature control such as temperature error of ±0.4° C. at a heating rate of about 20° C./sec. and a constant temperature condition in, for example, the above-described reaction system (see FIGS. 7 through 9).

Yet further, in a process for producing a reactor 10 according to the present invention (see FIGS. 4 through 6), a master 200 having a convex structure that becomes a template of a flow channel 24 in a PDMS substrate 14 can be repeatedly utilized by applying only fluorocarbon treatment upon the master 200 before templating thereof.

Accordingly, it is possible to easily fabricate a number of PDMS substrates 14 by merely patterning a small number of times with reuse of the master 200, besides it is advantageous to fabricate a micro structure at a low cost.

In addition, a reactor 10 according to the present invention has a hybrid structure composed of a glass substrate 12 and a PDMS substrate 14. In this respect, the PDMS substrate 14, which is inexpensive, may be peeled off to exchange it in every uses, while the glass substrate 12, which is comparatively expensive and required for troublesome operations in fabrication thereof, may be used repeatedly after washing it.

It is possible to produce very inexpensively the reactor 10 of the present invention with taking the producing processes as described above into consideration. Therefore, the reactor 10 is suitable for disposable use wherein it is discarded after utilizing it only once.

Such disposable reactor 10 exhibits a low probability of cross contamination and can constitute an inexpensive disposable system while maintaining a complicated temperature control mechanism. Thus, such system satisfies demands in field of research, medical field and the like. For instance, it is considered that instantaneous chemical reaction becomes possible in case of checkup, whereby it contributes to highly efficient operations in a site of clinical medicine.

Moreover, according to a reactor 10 of the present invention, a whole size of the reactor may be defined in such that a length is 20 mm, a width is 20 mm, and a height is 1 mm. Thus, the resulting reactor 10 itself is very small as a micro system, so that a space for placing the reactor 10 requires only a small area.

Accordingly, a compact reactor 10 according to the present invention can be mounted on a variety of self-propelled robots such as robot for working in polar region, so that observation in a polar atmosphere can be realized by utilizing the present reactor 10, although a conventional reactor could not be mounted on such robot for working in polar region because of its large size.

Furthermore, a reactor 10 according to the present invention is composed of all the transparent components of a heater 16, a temperature sensor 20, and electrical wirings 18, 22; besides, both of a glass substrate 12 and a PDMS substrate 14 are transparent, so that the whole structure of the reactor 10 becomes transparent. Hence, it becomes possible to observe transmitted light and fluorescence in a biological specimen poured into the reactor 10.

Still further, according to a reactor 10 of the present invention, transcription-translation reaction wherein predetermined samples are used to synthesize a fluorescent protein as a product can be carried out in accordance with a manner as described above (see FIGS. 7 through 9). Accordingly, a protein can be purified from genes by the use of the reactor 10 without adopting a production method of gene recombination. As a result, it becomes possible to synthesize proteins at high efficiency while controlling various reaction conditions in detail.

The above-described embodiment may be modified properly as described in the following paragraphs (1) through (6).

(1) While a variety of materials for preparing a reactor 10 has been exemplified in the above-described embodiment, the invention is not limited to these materials as a matter of course, but the reactor 10 may be prepared from a material in response to a variety of use applications. For instance, a silicon (Si) wafer may be used in place of a glass layer 12a made of glass in a glass substrate 12. A heater 16 and a temperature sensor 20 may be prepared from $SnO_2$. Further, a PDMS substrate 14 may be prepared from plastics or glass in place of PDMS.

Thus, in this respect, an opaque reactor may be prepared by employing prescribed materials in response to a variety of use applications.

(2) Although a whole size of a reactor 10, dimensions of a flow channel 24, and the like dimensions have been exemplified in the above-described embodiment, the present invention is not limited thereto as a matter of course, but they may be set arbitrarily according to need, so that dimensions may be selected in response to a variety of use applications.

(3) In the above-described embodiment, a reactor 10 has been provided with a heater 16 and a temperature sensor 20, whereby a temperature of the reactor 10 is controlled, or the reactor 10 is heated, but the invention is not limited thereto as a matter of course, and the reactor 10 may be provided with a fun and a Peltier element, so that it is possible to cool the reactor 10 in addition to heat the same, whereby a range to which the reactor 10 may be applied can be expanded for PCR reaction or the like, which is conducted at high-speed with a smaller amount of samples.

Figure 3:
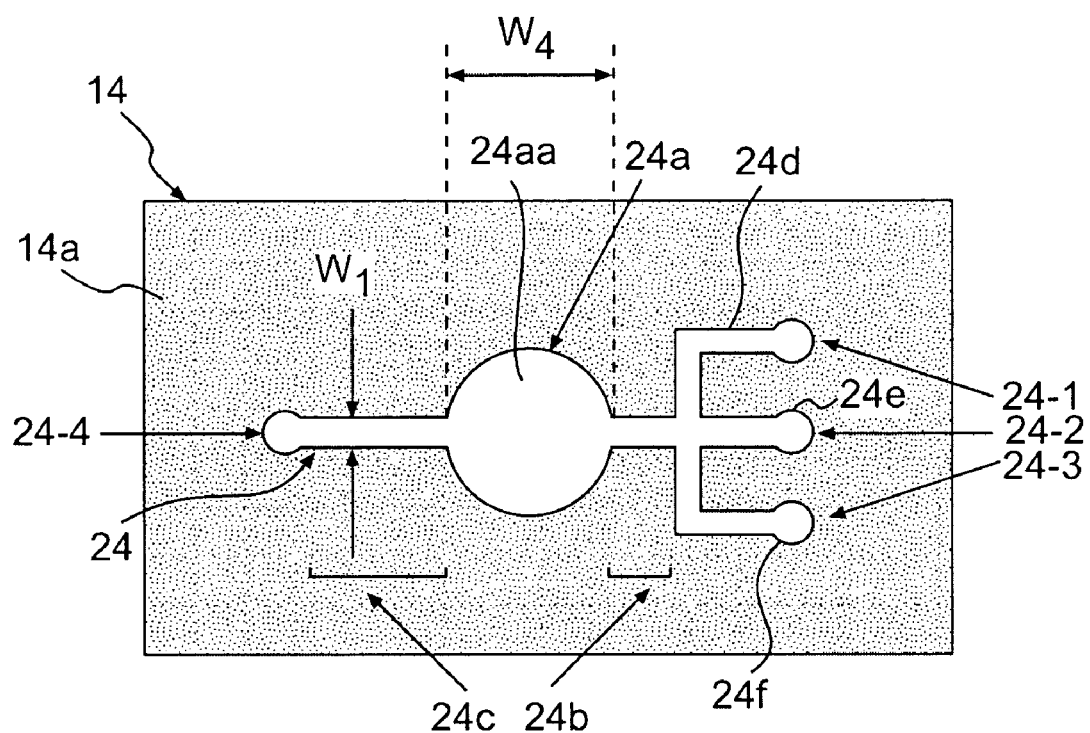
FIG. 3 is a schematic constitutional explanatory view showing principally a flow channel of a PDMS substrate in a reactor according to the present invention.

(4) While a contour of a flow channel 24 has been defined to the one as shown in FIG. 3 in the above-described embodiment, the invention is not limited as a matter of course, the contour of the flow channel 24 may be changed in response to a variety of use applications. For instance, both of a flow channel 24*d'* extending from an inlet 24-1 to a mixing section 24*b* and a flow channel 24*f'* extending from an inlet 24-3 to the mixing section 24*b* may be formed into a straight line contour, respectively.

Furthermore, a contour of the bottom 24*aa* of a concave section 24*a* in the flow channel 24 is not limited to a circular shape, but it may be an elliptical or a rectangular shape, whereby such a reaction chamber 26, which has a contour in response to that of the bottom 24*aa*, may be formed.

Moreover, the number of the inlets 24-1, 24-2, 24-3 and an outlet 24-4 in the flow channel is not limited to three and one, respectively, but it may be arranged in such there are at least one opening for pouring a sample into the flow channel 24, and at least one opening for discharging a reaction product from the flow channel 24.

Besides, it may be arranged in such that the concave section 24*a* is not defined in the flow channel 24, and the mixing section 24*b* is directly connected to a discharging section 24*c* through no reaction chamber 26. In this structure, samples are continuously poured from the inlets 24-1, 24-2, and 24-3, and at the same time, a reaction product is continuously taken out from the outlet 24-4, whereby such reactor obtained can be used in a chemical reaction with a high reaction speed.

(5) Although only one reactor 10 has been employed in the above-described embodiment, the number is not limited thereto as a matter of course, and a plurality of the reactors 10 may be used.

Figure 11B:
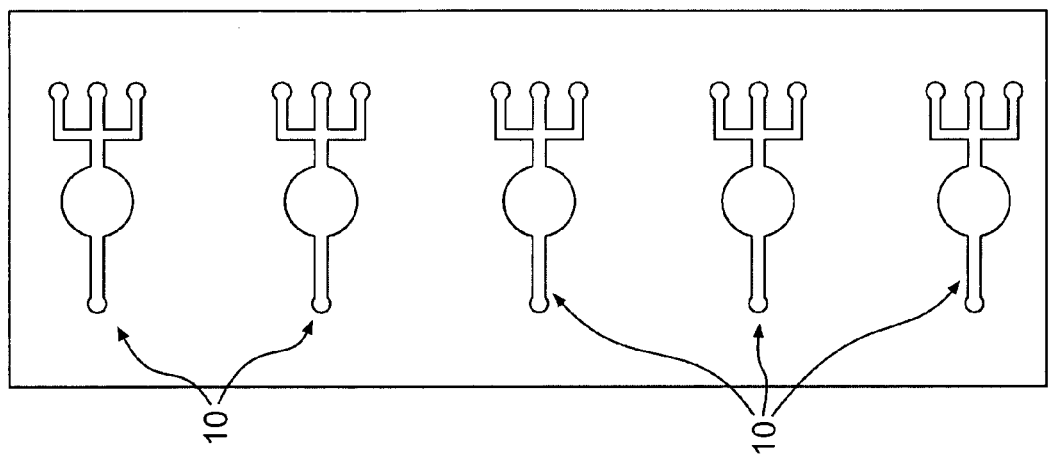
Figure 11A:
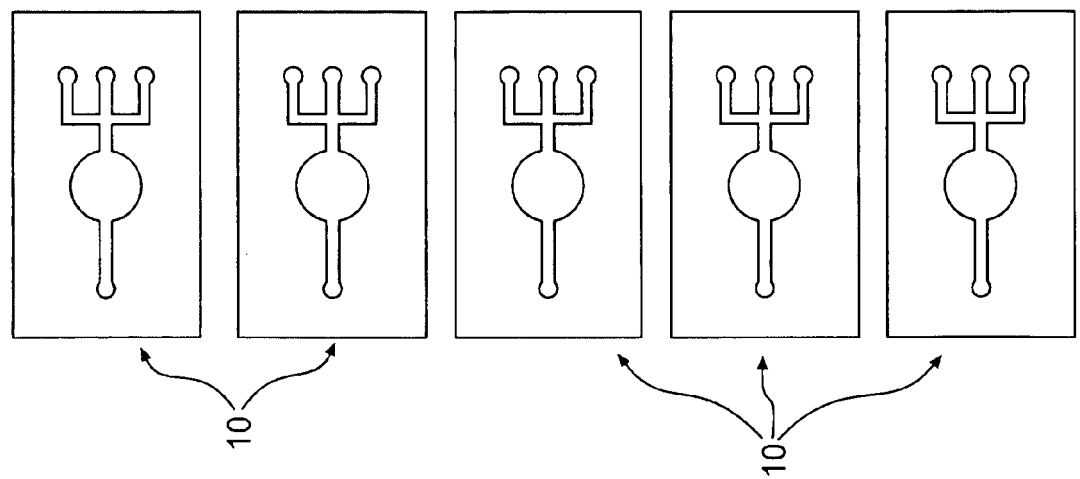

For instance, plural reactors 10 are separately prepared, and the pluralities of reactors 10 may be used in parallel to each other as shown in FIG. 11(*a*), whereby it becomes possible to process a number of operations for synthesizing pluralities of mutant genes. In this case, a variety of modifications including automation and parallel processing of peripheral devices such as an interface with respect to the outside for introducing a variety of solutions into the reactors, a system for supplying the solutions or the like may be made in response to the parallel processing of the reactors 10 themselves.

In addition, even if a plurality of reactors 10 is integrally incorporated as shown in FIG. 11(*b*), the above-described processing may be made as in the case where the plurality of reactors 10 are separately prepared.

(6) The above-described embodiment may be combined properly with the modifications described in the above paragraphs (1) through (5), respectively.

Since the present invention has been constituted as described above, it can provide a reactor in which a chemical reaction or an analysis may be made with the use of a small amount of samples and a process for the production of such reactors.

Furthermore, since the present invention has been constituted as described above, it can provide a reactor in which a temperature in a reaction chamber becomes uniform, so that decrease in reaction efficiency and production of a number of by-products can be suppressed and a process for the production of such reactors.

Moreover, since the present invention has been constituted as described above, it can provide a reactor that may be produced inexpensively, and is suitable for discarding after using it only once, i.e., a disposable reactor and a process for the production of such reactors.

It will be appreciated by those of ordinary skill in the art that the present invention can be embodied in other specific forms without departing from the spirit or essential characteristics thereof.

The presently disclosed embodiments are therefore considered in all respects to be illustrative and not restrictive. The scope of the invention is indicated by the appended claims rather than the foregoing description, and all changes that come within the meaning and range of equivalents thereof are intended to be embraced therein.

The entire disclosure of Japanese Patent Application No. 2000-278502 filed on Sep. 13, 2000 including specification, claims, drawing and summary are incorporated herein by reference in its entirety.

What is claimed is:

1. A reactor comprising:
   a flat plate-like first substrate provided with a heating means inside said first substrate;
   a flat plate-like second substrate, which is placed on the top of said first substrate, and said second substrate having a flow channel with a predetermined contour defined on a surface thereof which is placed on the top of said first substrate;
   said flow channel defined on said second substrate forms a concaved depression with respect to the top of said first substrate within a section opposed to the heating means provided on the inside of said first substrate with said channel being defined on the top of said first substrate, and said concaved depression defines a chamber with said second substrate being placed on the top of said first substrate;
   wherein said heating means in said first substrate has a rectangle-shaped region along the top of said first substrate, while said concaved depression of said flow channel in said second substrate has a columnar shape, and a circle-shaped region of the bottom of the depression in the column-shaped concaved depression is narrower than the rectangle-shaped region of said heating means in said first substrate.

2. A reactor comprising:
   a flat plate-like first substrate provided with a heating means inside said first substrate;
   a flat plate-like second substrate, which is placed on the top of said first substrate, and said second substrate having a flow channel with a predetermined contour defined on a surface thereof which is placed on the top of said first substrate;
   said flow channel in said second substrate being provided with a plurality of inlets;
   said flow channel defined on said second substrate forms a concaved depression with respect to the top of said first substrate within a section opposed to the heating means provided on the inside of said first substrate with said channel being defined on the top of said first substrate, and said concaved depression defines a chamber with said second substrate being placed on the top of said first substrate;
   wherein said heating means in said first substrate has a rectangle-shaped region along the top of said first substrate, while said concaved depression of said flow channel in said second substrate has a columnar shape, and a circle-shaped region of the bottom of the depression in the column-shaped concaved depression is narrower than the rectangle-shaped region of said heating means in said first substrate.

3. A reactor comprising:

a flat plate-like first substrate provided with a heating means inside said first substrate;

a flat plate-like second substrate, which is placed on the top of said first substrate, and said second substrate having a flow channel with a predetermined contour defined on a surface thereof which is placed on the top of said first substrate;

a temperature sensor disposed between said heating means, which is provided on the inside of said first substrate and the top of said first substrate;

said flow channel defined on said second substrate forms a concaved depression with respect to the top of said first substrate within a section opposed to the heating means provided on the inside of said first substrate with said channel being defined on the top of said first substrate, and said concaved depression defines a chamber with said second substrate being placed on the top of said first substrate;

wherein said heating means in said first substrate has a rectangle-shaped region along the top of said first substrate, while said concaved depression of said flow channel in said second substrate has a columnar shape, and a circle-shaped region of the bottom of the depression in the column-shaped concaved depression is narrower than the rectangle-shaped region of said heating means in said first substrate.

4. A reactor as claimed in claim 1 wherein:

all of said first substrate, said heating means provided on the inside of said first substrate, said temperature sensor, and said second substrate are transparent.

5. A reactor as claimed in claim 2, wherein:

all of said first substrate, said heating means provided on the inside of said first substrate, said temperature sensor, and said second substrate are transparent.

6. A reactor as claimed in claim 3 wherein:

all of said first substrate, said heating means provided on the inside of said first substrate, said temperature sensor, and said second substrate are transparent.

7. A reactor as claimed in claim 1 wherein:

both of said first substrate and said second substrate are micro chips.

8. A reactor as claimed in claim 2 wherein:

both of said first substrate and said second substrate are micro chips.

9. A reactor as claimed in clam 3 wherein:

both of said first substrate and said second substrate are micro chips.

10. A reactor as claimed in claim 8 wherein:

both of said first substrate and said second substrate are micro chips.

11. A reactor as claimed in claim 5 wherein:

both of said first substrate and said second substrate are micro chips.

12. A reactor as claimed in claim 6 wherein:

both of said first substrate and said second substrate are micro chips.

* * * * *